United States Patent [19]
Fujimoto

[11] Patent Number: 5,513,353
[45] Date of Patent: Apr. 30, 1996

[54] CACHE CONTROL SYSTEM WHICH PERMANENTLY INHIBITS LOCAL BUT NOT GLOBAL PARAMETER DATA WRITES TO MAIN MEMORY

[75] Inventor: Akihisa Fujimoto, Akishima, Japan

[73] Assignee: Kabushiki Kaisha Toshiba, Kawasaki, Japan

[21] Appl. No.: 401,292

[22] Filed: Mar. 9, 1995

Related U.S. Application Data

[63] Continuation of Ser. No. 765,007, Sep. 24, 1991, abandoned, which is a continuation-in-part of Ser. No. 249,789, Sep. 27, 1988, abandoned.

[30] Foreign Application Priority Data

Sep. 30, 1987 [JP] Japan .................................. 62-246130

[51] Int. Cl.⁶ ..................................................... G06F 17/30
[52] U.S. Cl. ................. 395/600; 395/440; 364/964.341; 364/964.342; 364/DIG. 1; 364/243.4; 364/286
[58] Field of Search ..................................... 395/600, 425, 395/440; 364/964, 341, 342

[56] References Cited

U.S. PATENT DOCUMENTS

| | | | |
|---|---|---|---|
| 4,442,484 | 4/1984 | Childs, Jr. et al. | 395/425 |
| 4,530,049 | 7/1985 | Zee | 395/425 |
| 4,594,682 | 6/1986 | Drimak | 395/800 |
| 4,654,819 | 3/1987 | Stiffler et al. | 395/425 |
| 4,775,955 | 10/1988 | Liu | 395/425 |
| 4,777,588 | 10/1988 | Case et al. | 395/800 |
| 4,811,388 | 3/1989 | Westerhof et al. | 379/229 |
| 4,905,141 | 2/1990 | Brenza | 395/425 |
| 4,916,605 | 4/1990 | Beardsley et al. | 395/425 |
| 5,025,366 | 6/1991 | Baror | 395/425 |
| 5,091,850 | 2/1992 | Culley | 395/400 |
| 5,255,384 | 10/1993 | Sachs et al. | 395/425 |

OTHER PUBLICATIONS

Motorola, "MC68030 Enhanced 32–Bit Microprocessor User's Manual", 1987, pp. 6–1 to 6–12.
Motorola, "16–Bit Microprocessor User's Manual", Second Edition 1980, pp. B–42, B–43, B–88 & C–1.

*Primary Examiner*—Thomas G. Black
*Assistant Examiner*—Wayne Amsbury
*Attorney, Agent, or Firm*—Foley & Lardner

[57] ABSTRACT

A data cache memory is dynamically allocated as a global area which can be accessed in tasks other than a current task, and a local area which can be accessed in only a specific task. In the global area, data processing is controlled by the write through or copy back technique, in the same manner as in a conventional system. With respect to an access to the local area, an access is allowed to only the data cache memory, but is inhibited in relation to a main memory. For this reason, the tag section of the data cache memory includes a flag indicating a local or global area, and a task number storage field indicating a task in which a secured local area is accessed.

27 Claims, 5 Drawing Sheets

CACHE CONTROL SYSTEM WHICH PERMANENTLY INHIBITS LOCAL BUT NOT GLOBAL PARAMETER DATA WRITES TO MAIN MEMORY

This application is a continuation of application Ser. No. 07/765,007, filed Sep. 24, 1991, now abandoned, which is a continuation in part of application Ser. No. 07/249,789, filed Sep. 27, 19988, now abandoned.

This is a continuation-in-part of application 07/249,789 filed Sep. 27, 1988, abandoned.

BACKGROUND OF THE INVENTION

1. Field of the Invention

The present invention relates to a control system and method of a data cache memory arranged between a central processing unit (CPU) and a main memory.

2. Description of the Related Art

With recent improvements in microcomputers, various microprocessors have been developed. For example, a 32-bit microprocessor was developed as such a microprocessor. Such a microprocessor, for example, the 32-bit microprocessor M68020 is available from Motorola Ltd., U.S.A. This microprocessor M68020 is provided with instructions (LINK and UNLINK instructions) for securing variables so that use of global and local variables is allowed. Such LINK and UNLINK instructions are described in, e.g., "MC68030 Enhanced 32 Bit Microprocessor Users Manual." A global variable can be accessed in an entire program, whereas a local variable can be accessed in only a certain module (task) constituting the program.

More specifically, the LINK and UNLINK instructions allocate and deallocate a certain area in a system stack, of a main memory respectively. The LINK and UNLINK instructions are used for a nested subroutine, a link list or a procedure. The LINK instruction is executed succeeding to a procedure call (a subroutine call to be nested). When the LINK instruction is executed, a pointer in an address register is updated to designate the data area. After the subroutine is executed, the UNLINK instruction is executed to perform an operation opposite to the LINK instruction. More specifically, the UNLINK instruction restores the stack pointer and the address register to previous values before the LINK instruction is executed. The details of the LINK and UNLINK instructions are described in "16-BIT MICROPROCESSOR User's Manual" by MOTOROLA.

However, in the prior art, since the local area is provided in the main memory, the processing speed is constrained to the memory cycle, resulting in low processing speed.

However, when an interruption is generated during execution of the program or task switching is performed during multitask processing, the contents of the cache memory must be rewritten in the main memory. That is, since the cache memory is a copy of part of the address space of the main memory, the contents of the cache memory must coincide with the contents of the corresponding area of the main memory. Therefore, when an interruption is generated or a task is switched, no problem is posed in the read operation with respect to the cache memory. When data is written in the cache memory, however, the data must be also written in the main memory. In this case, "write through", "copy back", or the like is used as a technique of writing data in the main memory. In the "write through" technique, data is written in the main memory immediately after the data is written in the cache memory. According to the "copy back" technique, a certain amount of data are preserved, and the preserved data are collectively written in the main memory later.

As described above, since the main memory is slower in writing speed than the cache memory, if data is written in the main memory every time an interruption is generated or a task is switched, overhead is inevitably increased. In a system having a conventional cache memory, a local area (having the same address space as that of the cache memory) is secured on the main memory, and local variables are stored in the local area. A necessary local variable is accessed using a stack pointer. In this case, if a local variable in the cache memory is updated, the corresponding data in the main memory must be updated, thereby degrading the high-speed operation of the overall system.

SUMMARY OF THE INVENTION

It is an object of the present invention to provide a data cache memory control system and a method which can prevent a decrease in speed associated with writing access to a cache memory.

In order to achieve the above-described object, according to the present invention, there is provided a data cache memory control system having a main memory, a data cache memory in which part of the main memory is copied, and a central processing unit (CPU) for accessing the main memory and the data cache memory, comprising: data cache memory allocating means for allocating at least global and local areas in the data cache memory, the global area being accessed in any one of a plurality of modules constituting a program and the local area being accessed in only a specific module; local area access detecting means for detecting an access to the local area and outputting a detection signal; and main memory access inhibit means for inhibiting an access to the main memory in response to the detection signal from the local area detecting means.

According to the data cache memory control system of the present invention, a field for storing a flag representing whether a variable stored in a data field of the cache memory is a global or local variable is arranged in a tag section for every data field. When this flag represents a global variable, the cache memory is controlled in a conventional manner. That is, in a read operation, if target data is obtained in the cache memory, the "HIT" signal is output. If it is not obtained, the main memory is accessed. In a write operation, the global variable (or other data) is written in the cache memory, and at the same time, identical data is written in the main memory by the write through or copy back technique, or the like.

In contrast, if the flag represents a local variable, access is inhibited in both read and write operations, thereby realizing high-speed processing. In addition, by adding a task number to the tag section of the data cache memory, for example, even when the CPU processes task B because an interruption is generated during processing of task A, the contents of task A in the local area are saved. Therefore, processing such as copy back is not required. The present invention is effective especially when a large-capacity data cache memory can be designed with an increase in integration density.

DETAILED DESCRIPTION OF THE PREFERRED EMBODIMENTS

Figure 1:
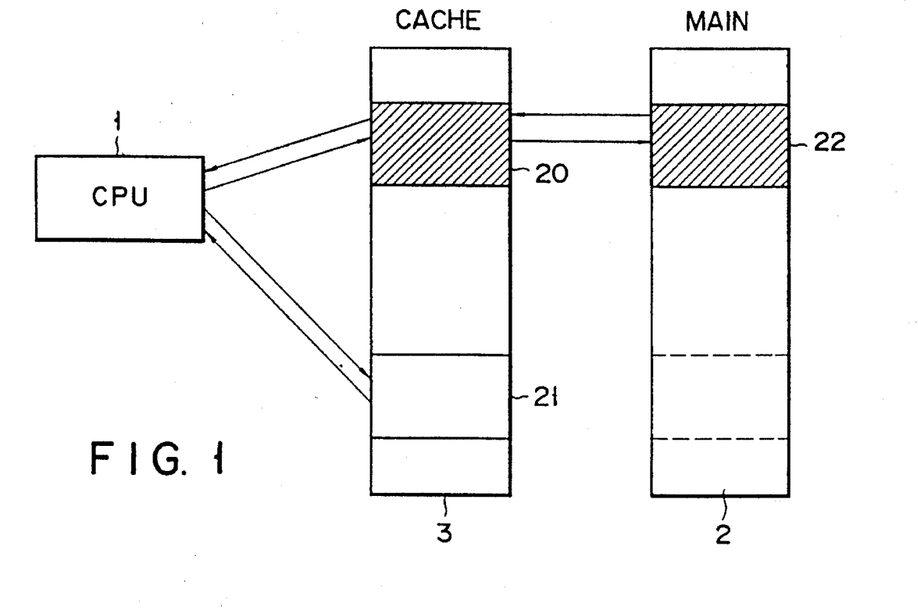
FIG. 1 is a view showing the principle of the present invention.

FIG. 1 shows the principle of the present invention. As shown in FIG. 1, global and local areas 20 and 21 are arranged in data cache memory 3. When CPU 1 writes a variable in data cache memory 3, if it is a global variable, it writes the global variable in global area 22 of main memory 2 as well as in global area 20 of data cache memory 3. On the other hand, CPU 1 writes a local variable in local area 21 of data cache memory 3 but not in main memory 2.

In a read operation, if a global variable is not hit in the cache memory, a read operation is performed with respect to the main memory. In processing of a local variable, however, even if a hit is not obtained in the cache memory, a read operation with respect to the main memory is not performed (in this case, a trap is generated to inform the CPU of an erroneous access).

An embodiment for realizing the present invention will be described with reference to FIGS. 2 through 5.

Figure 2:
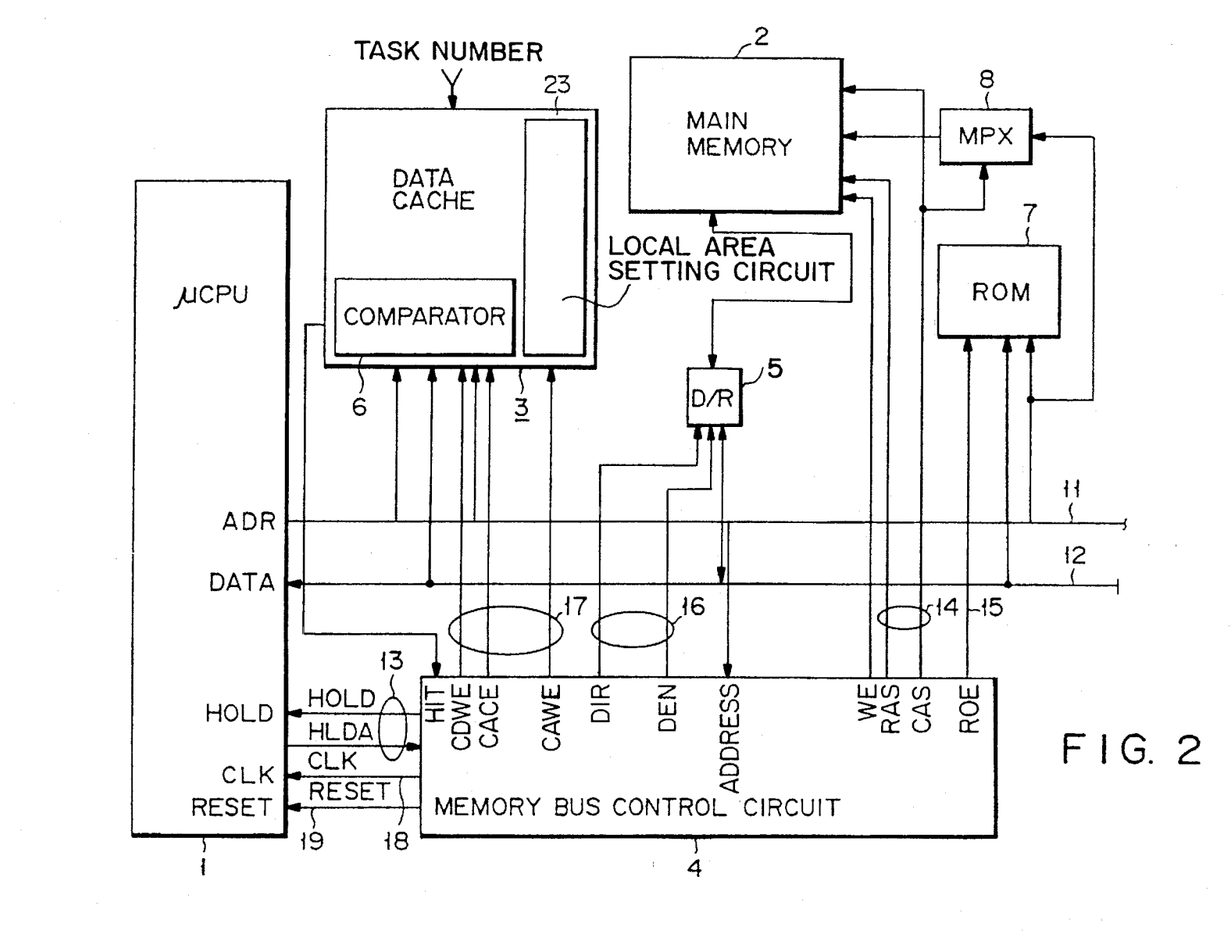
FIG. 2 is a block diagram showing an embodiment of the present invention.

Referring to FIG. 2, microprocessor 1 is, e.g., a 32-bit microprocessor. As such microprocessor 1, for example, the 32-bit microprocessor M68020 available from Motorola Inc., U.S.A. can be used. Data cache memory 3 is connected to microprocessor 1 through address and data buses 11 and 12. Data cache memory 3 has a capacity of, e.g., 32 Kbyte, and incorporates comparator 6 and local area setting circuit 23. In addition, main memory 2 is connected to microprocessor 1 through address and data buses 11 and 12, and driver/receiver 5. Main memory 2 has a capacity of, e.g., 1 Mbyte. An address from microprocessor 1 is supplied to main memory 2 through address bus 11 and multiplexer 8. In addition, read-only memory (ROM) 7 is connected to data cache memory 3 and main memory 2. Memory bus control circuit 4 is connected to microprocessor 1, data cache memory 3, main memory 2, and ROM 7. Memory bus control circuit 4 serves as memory interface of data cache memory 3, main memory 2, and ROM 7 with microprocessor 1, and serves as bus interface between microprocessor 1, and address and data buses 11 and 12. Memory bus control circuit 4 receives hold signal HLDA from microprocessor 1, and supplies hold signal HOLD, operation clock signal CLK 18, and reset signal RESET 19 to microprocessor 1. Furthermore, memory bus control circuit 4 supplies a cache data write enable (CDWE) signal 17, a cache address chip enable (CACE) signal, and a cache address write enable (CAWE) signal 17 to data cache memory 3, and receives a HIT signal from data cache memory 3. In addition, memory bus control circuit 4 supplies a DIR signal representing the direction of data and data enable signal DEN 16 to driver/receiver 5.

Moreover, circuit 4 supplies to main memory 2 write enable signal WE representing a read or write operation (a write operation is performed with respect to the main memory when signal WE is output, and a read operation is performed therewith when WE signal is not output), a raster address strobe (RAS) signal, and a column address strobe (CAS) signal, and also outputs ROM output enable signal ROE 15 to ROM 7. Like a conventional circuit, memory bus control circuit 4 is designed not to output signals RAS and CAS upon reception of a HIT signal from data cache memory 3. Therefore, access to main memory 2 is not made. In this embodiment, when a local variable is to be read/written from/in data cache memory 3, a HIT signal is output from data cache memory 3. Therefore, memory bus control circuit 4 does not supply RAS and CAS signals to the main memory. That is, when a local variable is processed, main memory 2 is not accessed.

Figure 3:
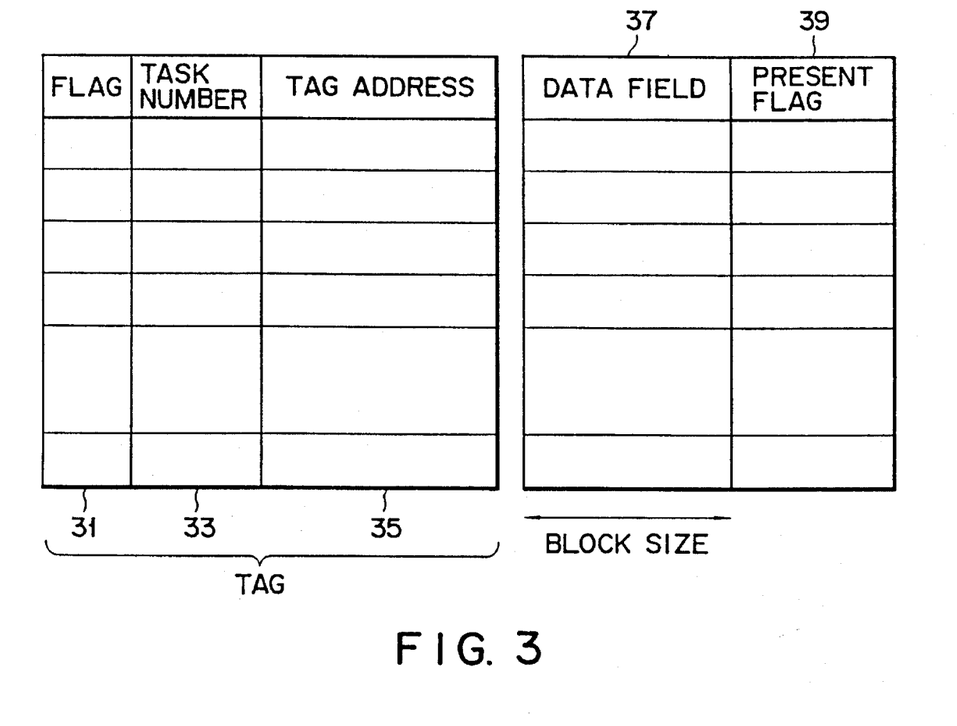
FIG. 3 is a block diagram showing the internal structure of a data cache memory.

According to the present invention, a variable to be written in data cache memory 3 is determined to be a local variable by detecting that an instruction being executed by CPU 1 is a stack operation instruction on the basis of the fact that a local variable is conventionally stored in a stack arranged in main memory 2. FIG. 3 is a block diagram showing the internal structure of data cache memory 3. As shown in FIG. 3, data cache memory 3 comprises flag field 31, task number field 33, tag address field 35, data field 37, and present flag field 39. Flag field 31, task number field 33, and address field 35 constitute a tag section. Flag field 31 stores a flag indicating that data stored in a corresponding data field is a global or local variable. Task number field 33 stores a number identifying a task in multitask processing. Tag address field 35 stores an address in main memory 2 where corresponding data is stored. Data field 37 stores a local or global variable. In the case of multitask processing, the data field is determined by the task number and the tag address. Present flag field 39 stores a flag indicating whether data as an access minimum unit, e.g., 32-bit data in this embodiment, is valid or not. The present flag is set to be invalid (at logic "0") in the initialization mode. In addition, when the data cache memory is to be updated, new data is written in a data field having an invalid present flag. In this case, if a plurality of present flags "0" are present, one of them in which the new data is written on the basis of the LRU (Least Recently Used) algorithm is determined. The LRU algorithm determines which data among the cache memory is least recently used. This LRU algorithm is useful when data is stored from the cache memory in the main memory. When a local variable is to be read from data cache memory 3, if the present flag is set at logic "0", a trap is generated to inform microprocessor 1 of an erroneous access.

Figure 4:
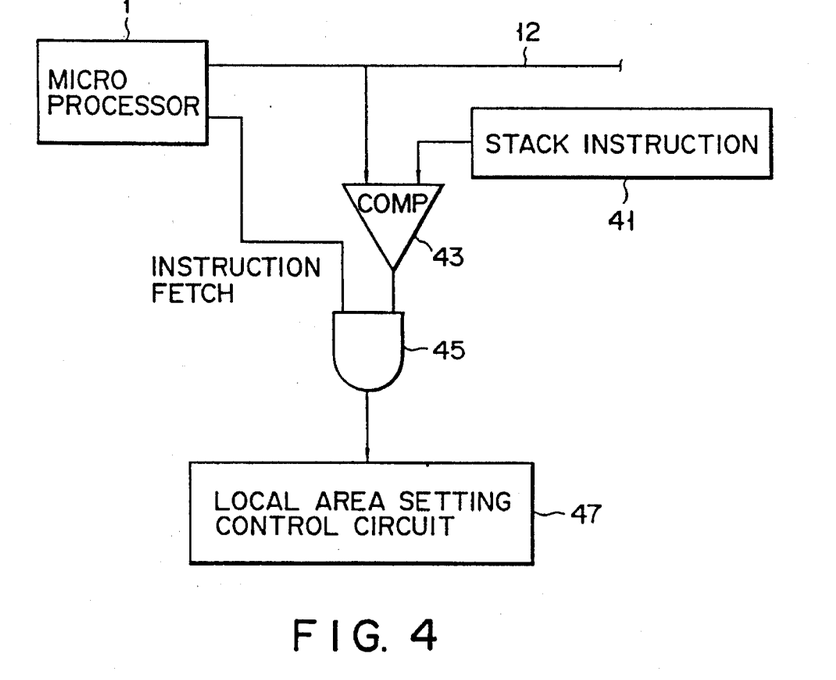
FIG. 4 is a circuit diagram of a circuit for detecting that a variable written in the cache memory is a local variable.

FIG. 4 is a detailed circuit diagram showing local area setting circuit 23 arranged in data cache memory 3. Circuit 23 has functions of monitoring an instruction executed by microprocessor 1 and securing a local area in data cache memory 3. An instruction to be monitored is, e.g., an instruction of securing a local area in a stack an instruction of loading data in the stack. Comparator 43 compares an instruction read out from the main memory 2 by the microprocessor 1 through data bus 12 with, e.g., an operation code of a stack operation instruction prestored in internal register 41, which is a predetermined register of the local area setting circuit 23. If they coincide with each other upon comparison, the data is determined to be a stack operation instruction, and a coincidence signal is supplied to one input terminal of AND gate 45. In addition, an instruction fetch signal is supplied from microprocessor 1 to the other input terminal of AND gate 45. As a result, if microprocessor 1 is executing a cycle of instruction fetch and the instruction is a stack operation instruction, a stack operation instruction detection signal is output from AND gate 45. Local area setting circuit 47 allocates a local area corresponding to the byte number designated by the stack operation instruction in data cache memory 3 on the basis of the LRU algorithm.

Figure 5:
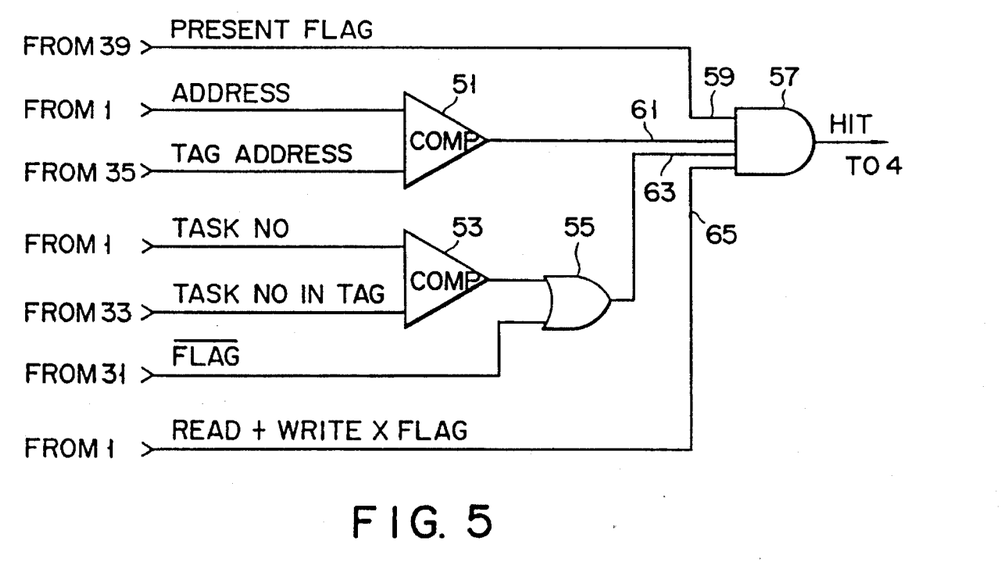
FIG. 5 is a circuit diagram of a circuit for allowing access to a main memory with respect to a global variable and for inhibiting a local variable from being written in the main memory in a write operation of a variable with respect to the cache memory.

FIG. 5 is a detailed circuit diagram of comparator 6 in FIG. 2.

Comparator 6 is designed to output a HIT signal under the following conditions. When flag 31 of the tag section is set at logic "0", i.e., corresponding data is not a local variable, an address output from microprocessor 1 is compared with a tag address. If a coincidence is established upon comparison and present flag 39 is set at logic "1", i.e., present flag 39 indicates that the data stored in data field 37 is valid, a HIT signal is output in a read operation. In a write operation, the data is written in data cache memory 3 while the data is also written in main memory 2 by the write through or copy back technique, or the like.

In contrast to this, when flag 31 is set at logic "1", i.e., represents a local variable, if the following three conditions are satisfied: i) the present flag is set at logic "1", ii) an address in main memory 2 supplied from microprocessor 1 coincides with address tag 35, and iii) a task number and a tag address (or a tag address only in the case of a singe task) supplied from microprocessor 1 or an operating system coincides with a task number and tag address in the tag section, data cache memory 2 outputs a HIT signal regardless of whether the operation is a read or write operation.

Figure 6A:
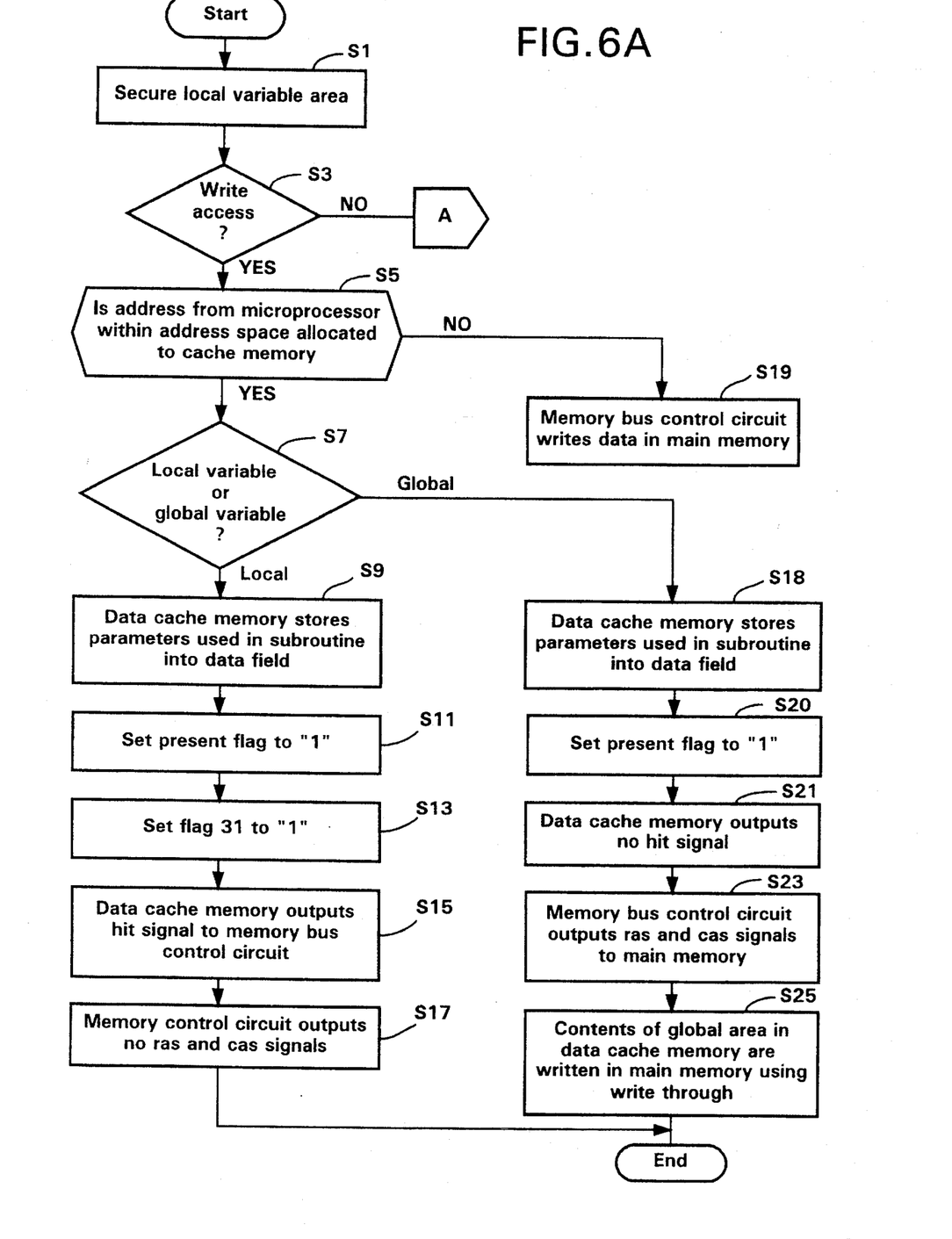
FIGS. 6A and 6B are flow charts showing an operation of the data cache memory control system according to the present invention.
Figure 6B:
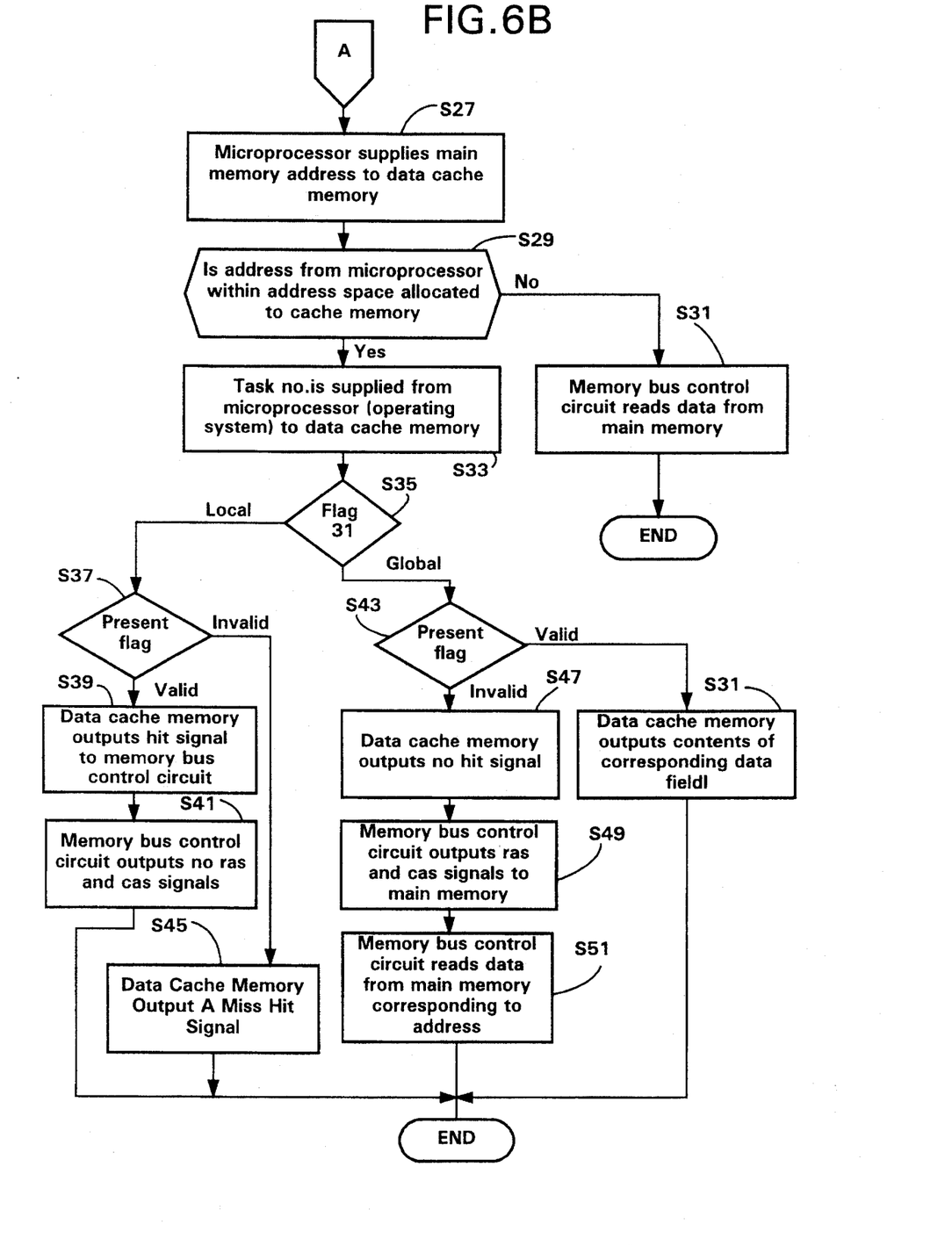

An operation of the embodiment of the present invention with the above-described arrangement will be described with reference to the flow chart shown in FIGS. 6A and 6B.

Assume that task A is started, and microprocessor 1 executes an instruction of securing a local variable area on the stack (e.g., a stack operation instruction such as a LINK instruction in M68020). As a result, an instruction fetch signal is output from microprocessor 1 to AND gate 45, and instruction data is output to comparator 43 through data bus 12. Comparator 43 compares the data supplied through data bus 12 with the stack operation instruction supplied from internal register 41. In this case, since they coincide with each other, comparator 43 supplies a coincidence signal to one input terminal of AND gate 45. As a result, AND gate 45 outputs a stack operation instruction detection signal to local area setting circuit 47. Then, local area setting circuit 47 secures part of data cache memory 3, which is allocated as a global area, as a local area on the basis of the LRU (Least Recently Used) algorithm (step S1). In the data write mode, it is determined whether an address supplied from microprocessor 1 is present in an address space assigned to data cache memory 3 or not (steps S3 and S5). If so, it is further determined whether the variable to be written in data cache memory 3 is a local variable or not (step S7). If it is a local variable, data cache memory 3 outputs a HIT signal to memory bus control circuit 4. More specifically, when data is to be written in cache memory 3 in FIG. 5, in response to the data, e.g., an instruction of loading various parameters used in a subroutine, data cache memory 3 stores the parameters in data field 37 and sets present flag 39 at logic "1" (step S9). In addition, in response to an instruction of setting flag 31, data cache memory 3 sets flag 31 at logic "1" (step S13). In this case, present flag "1" is supplied to first input terminal 59 of AND gate 57. Furthermore, a tag address written in the tag section and an address in main memory 2 supplied from microprocessor 1 are compared with each other by comparator 51. In this case, since they coincide with each other, a coincidence signal is supplied to second input terminal 61 of AND gate 57. A task number in the tag section and a task number supplied from an operating system or microprocessor, are compared with each other by comparator 53. Upon comparison, a coincidence signal from comparator 53 is supplied to OR gate 55. At this time, flag 31 set at logic "1" is supplied to OR gate 55. Therefore, OR gate 55 supplies signal "1" to third input terminal 63 of AND gate 57. In addition, signal "1" is supplied to the fourth input terminal 65 of AND gate 57 (in this case, since flag 31 is set at logic "1", signal "1" is supplied in both the read and write modes). Therefore, the AND conditions are satisfied, and AND gate 57 outputs a HIT signal to memory bus control circuit 4, so that memory bus control circuit 4 does not output RAS and CAS signals (steps S15 and S17). As a result, the data is not written in main memory 2.

If the determination of step S5 is "NO"0 the memory bus control circuit 4 writes data in the main memory 2 (step S19).

In contrast to this, when flag 31 is set at logic "0", corresponding data is not a local variable. In this case, the data cache memory stores the parameters used in the subroutine into the data field (step S18) and then the present flag is set to "1" (step S20). In this case, OR gate 55 always outputs data "1" regardless of a task number. In addition, since an AND product of data "0" of flag 31 and data "1" of a write signal is obtained, data "0" is supplied to the fourth input terminal of AND gate 57. Therefore, AND gate 57 does not output a HIT signal. As a result, memory bus control circuit 4 outputs write enable signal WE, and RAS and CAS signals to main memory 2 (steps S21 and S23). With this operation, the same contents as that in the global area in data cache memory are written in main memory 2 using the write through or copy back technique, or the like (step S25). In the "write through" technique, data is written in the main memory immediately after data is written in the cache memory. According to the "copy back" technique, a certain amount of data are preserved and the preserved data are collectively written in the main memory later.

When data is to be read out from data cache memory 3, microprocessor 1 supplies a corresponding address in main memory 2 to data cache memory 3 (step S27). Then, it is determined whether an address from the microprocessor 1 is within an address space allocated to the cache memory 23 (step S29) If the determination is "NO", the memory bus control circuit reads data from the main memory 2 (step S31). In contrast, if the determination of step S29 is "YES", a task number and a tag address from the operating system or microprocessor 1 are supplied to data cache memory 3 (step S33). The data cache memory 3 refers to flag 31 to determine whether the variable is global or local (step S35). If the flag 31 represents the global variable, the cache memory 3 refers to present flag 39 corresponding to the task number and the tag address whether the data is valid ("1") or invalid ("0"). If it is valid, the contents in corresponding data field 37 are read (step S53). On the contrary, when present flag 39 represents invalidity of the data, (step S43) main memory 2 is read-accessed. When it is a local variable, main memory 2 is not read-accessed. That is, when a global variable is to be processed, present flag signal "0" is supplied to the first input terminal of AND gate 57. In addition, signals "1" are respectively supplied to the second, third, and fourth input terminals of AND gate 57 (step S47). Therefore, a HIT signal is not supplied to AND gate 57 (step S47). Since memory bus control circuit 4 outputs RAS and CAS signals (step S49), and write enable signal WE set at logic "0", main memory 2 is read-accessed (step S51).

In contrast, if the flag 31 represents the local variable, it is determined in step S37 whether the present flag 39 is valid or invalid. If the flag 39 is invalid, data cache memory outputs a miss hit signal (step S45). In contrast, if the present flag is valid in step S37, since the first through fourth input terminals of AND gate 57 are set at logic "1", AND gate 57 outputs a HIT signal (step S39). Consequently, memory bus control circuit 4 does not output RAS and CAS signals, and write enable signal WE (step S41). Thus, main memory 2 is not read-accessed. Note that since a present flag is set when data is written in a local area, if local data is read when the present flag is not set, a trap is generated to inform microprocessor 1 of occurrence of an error.

What is claimed is:

1. A data cache memory control system having a main memory, a data cache memory in which part of said main memory is copied, and a central processing unit (CPU) for accessing said main memory and said data cache memory, comprising:

data cache memory allocating means for allocating at least a global area for storing global parameters and a local area for storing localparameters in said data cache memory, the global area being accessed in any one of a plurality of modules constituting a program, and the local area being accessed in a specific module, said CPU writing global parameters in the global area and said main memory, and reading the global parameters from said main memory when the global parameters are not found in the global area;

local area access detecting means for detecting whether an access to the local area is performed; and memory access means for permanently inhibiting contents of the local area from being written into said main memory when the access to the local area is performed, and means for writing the local parameters only in the local area.

2. A system according to claim 1, wherein said memory access means inhibits the contents of the local area from being written into said main memory regardless of whether an access to the local area is a read or write access.

3. A system according to claim 1, wherein said data cache memory includes local/global area designating means for designating whether written data belongs to the local or global area.

4. A system according to claim 3, wherein said cache memory includes task identifying means for indicating that said data cache memory system is used for multitask processing, and indicating a task in which the local area is to be accessed.

5. A system according to claim 4, wherein said cache memory includes tag address means for designating a memory address of data stored in said data cache memory.

6. A system according to claim 3, wherein said local area access detecting means detects that said CPU executes an instruction of eliminating the local area from a stack, and said local/global area designating means changes the local area into a global area.

7. A system according to claim 1, wherein when said CPU write-accesses said data cache memory, said memory access means allows said CPU to write in said main memory data to be written in the global area and inhibits said CPU from writing in said main memory data to be written in the local area.

8. A system according to claim 1, wherein said memory access means allows said CPU to read-access said main memory if the desired global parameters are not found in the global area, and informs said CPU of an abnormal access signal if the local parameters are not found in the local area.

9. A system according to claim 1, wherein said local area access detecting means includes means for detecting that said CPU executes an instruction of storing the local parameters in a stack.

10. A data processing apparatus comprising:

a central processing unit (CPU);

a main memory;

data cache memory means in which part of said main memory is copied and which outputs a "HIT" signal when data, access to which is requested by said CPU, is found;

memory bus control means for supplying no address signal to said main memory when a "HIT" signal is output from said data cache memory means;

local area securing instruction execution detecting means for detecting that said CPU executes an instruction of securing a local area in a stack;

means for securing a local area in said data cache memory, in accordance with a detection of said local area securing instruction execution detecting means; and means for outputting a "HIT" signal to said memory bus control means if data, which are requested by the CPU, are found in the local area, so that said memory bus control means supplies no address signal to said main memory to permanently inhibit contents of said local area from being written into said main memory.

11. In a data cache memory control system having a main memory, a data cache memory in which part of the main memory is copied, and a central processing unit (CPU) for accessing the main memory and the data cache memory, a method for securing a local variable area being accessed in a specific module in the data cache memory, comprising the steps of:

a) monitoring an instruction executed by the CPU;

b) comparing the data of the instruction with an operation code of a certain fetched operation instruction;

c) outputting an instruction detection signal upon coincidence in step b);

d) securing the local variable area in the cache memory in accordance with the instruction detection signal when the CPU executes the operation instruction;

e) comparing an access address of the instruction with a tag address of the data cache memory to determine if requested data is in the cache memory;

f) determining whether the tag address is in the local variable area when a coincidence is obtained in step e);

g) storing the data in the data cache memory, when step f) indicates the existence of the tag address in the local variable area; and h) permanently inhibiting the CPU from writing contents of the local variable area into the main memory.

12. The method according to claim 11, wherein the certain operation instruction comprises a stack operation instruction.

13. The method according to claim 12, wherein the stack operation instruction comprises an instruction to allocate or deallocate a certain stack area.

14. The method according to claim 13, wherein the securing step comprises the steps of allocating the local variable area according to a number of bytes designated by the stack instruction in the cache memory and storing a first address to reexecute the interrupted program in a certain register.

15. The method according to claim 11, wherein the data cache memory has a tag section, which contains a tag address, a flag representing whether the variable area is local, and a valid flag representing whether data stored in the data field corresponding to the tag address is valid, and further comprising the step of:

i) setting the corresponding valid flag, and a local flag, when the result of step f) indicates the existence of the tag address in the local variable area.

16. A data cache memory control system, comprising:

a central processing unit (CPU);

a main memory;

a data cache memory having at least a local variable area for storing local parameters in a stack, the local variable area being accessed by the CPU in a procedure of an application program;

detecting means for detecting whether or not a memory read/write access with a stack operation instruction is performed;

means for determining whether an address output from the CPU is within address space allocated to the local variable area in the data cache memory, when the memory read/write access with a stack operation instruction is performed; and memory read/write access means for accessing the local variable area in the data cache memory means in accordance with a result of the determining means and permanently inhibiting contents of the local variable area from being written into said main memory.

17. The system according to claim 16, wherein the data cache memory has a tag section comprising a tag address, a present flag representing whether the data stored in data field corresponding to the tag address is valid, and wherein the determining includes:

means for determining whether the memory access with a stack operation instruction is a memory read access;

means for comparing an access address from the CPU means with the tag address to determine if the requested data is in the data cache memory; and means for determining whether the present flag is valid, when the memory read/write access with a stack operation instruction is a memory read access and whether the access address from the CPU is coincident with the tag address.

18. The system according to claim 17, wherein the memory read/write access means includes:

means for loading the local parameters corresponding to the tag address, when the present flag is valid.

19. The system according to claim 17, wherein the memory read/write access means includes:

means for information the CPU means of a miss hit signal representing that desired local parameters are not stored in the local variable area, when the present flag is invalid.

20. The system according to claim 16, wherein the data cache memory includes:

a global variable area for storing global parameters, the global area being accessed in one of a plurality of modules constituting a program;

a flag representing whether the variable area is global;

a tag section comprising a tag address; and a present flag representing whether data stored in a data field corresponding to the tag address is valid.

21. The system according to claim 20, further comprising:

means for comparing an address from the CPU means with the tag address to determine if the requested data is in the data cache memory;

means for determining a status of the flag representing whether the variable area is global;

means for determining a status of the present flag representing whether the data stored in data field corresponding to the tag address is valid; and means for accessing the global variable area in the data cache memory when the present flag is valid and the flag representing that the variable area is global.

22. The system according to claim 20, further comprising:

means for comparing an access address from the CPU with the tag address to determine if the requested data is in the data cache memory;

means for determining a status of the flag representing whether the variable area is global;

means for determining a status of the present flag representing whether the data stored in a data file corresponding to the tag address is valid; and means for informing the CPU means of a miss hit signal, when the present flag is invalid and accessing data in the main memory.

23. The system according to claim 16, wherein the data cache memory has a tag section comprising a tag address, a present flag representing whether the data stored in a data field corresponding to the tag address is valid, and a flag representing whether the variable area is local, and wherein the determining means includes:

means for determining whether the memory access with a stack operation instruction is a memory write access; and means for comparing an access address from the CPU means with the tag address to determine if the requested data is in the data cache memory means.

24. The system according to claim 23, wherein the memory read/write access means includes:

means for storing local parameters into the local variable area corresponding to the tag address, when the access address from the CPU is coincident with the tag address; and means for informing the CPU of a hit signal after the flag setting operation.

25. The system according to claim 20, wherein the determining means includes:

means for determining whether the global variable area in the data cache memory is write-accessed; and means for comparing an address from the CPU with the tag address to determine if the requested data is in the data cache memory means.

26. The system according to claim 25, wherein the memory read/write access means includes:

means for storing global parameters into the global variable area corresponding to the tag address on the basis of a least recently used algorithm, when the certain address and global variable area in the data cache memory is write-accessed; and means for setting the present flag representing that data stored in a data field corresponding to the tag address is valid.

27. The data cache memory control system according to claim 25, wherein the memory read/write access means includes:

means for informing the CPU of a miss hit signal after setting a valid value in the present flag; and means for storing contents of the global variable area in the main memory on the basis of a write through algorithm.

* * * * *